C. PRICE.
AUTOMOBILE VALVE LIFTER.
APPLICATION FILED JULY 25, 1912.
1,051,633.
Patented Jan. 28, 1913.
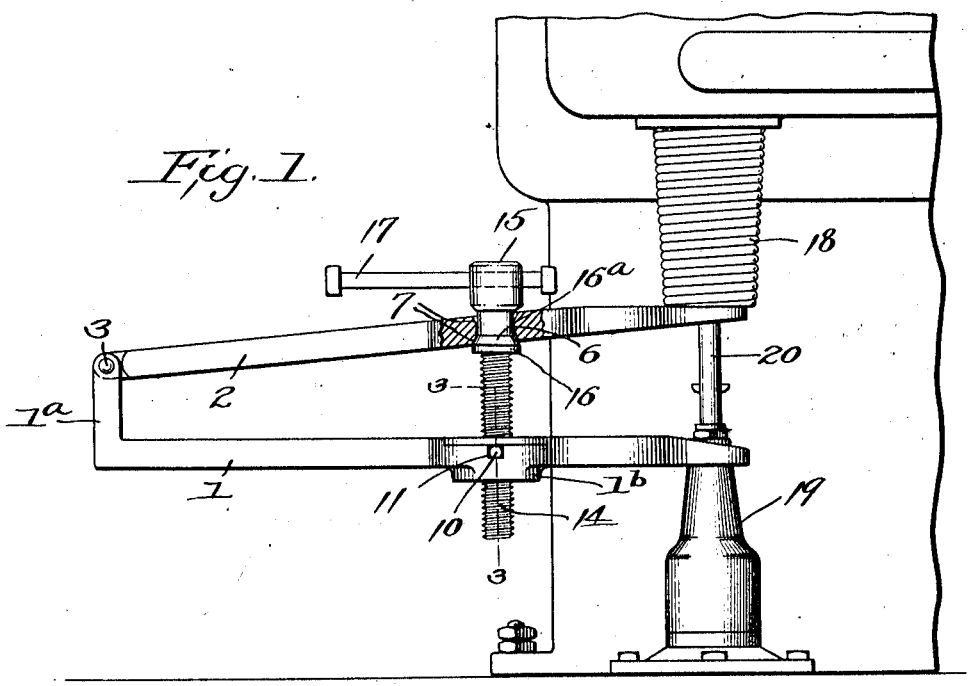
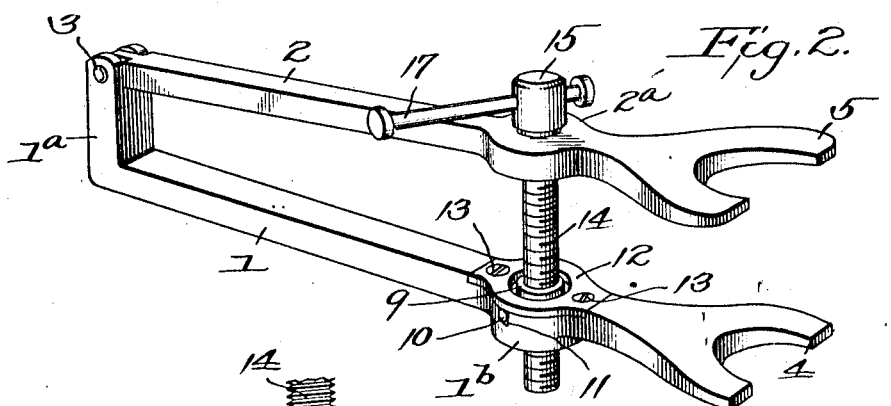
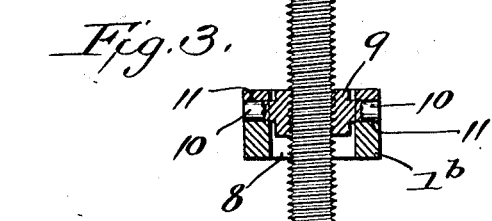
Witnesses
Inventor
C. Price
By
Attorney

UNITED STATES PATENT OFFICE.

CHARLES PRICE, OF CLINTON, MASSACHUSETTS.

AUTOMOBILE VALVE-LIFTER.

1,051,633.  Specification of Letters Patent.  Patented Jan. 28, 1913.

Application filed July 25, 1912. Serial No. 711,510.

*To all whom it may concern:*

Be it known that I, CHARLES PRICE, a citizen of the United States, residing at Clinton, in the county of Worcester and State of Massachusetts, have invented certain new and useful Improvements in Automobile Valve-Lifters, of which the following is a specification.

The present invention relates to certain new and useful improvements in automobile valve lifters, the object of the invention being to provide a device of this character which is comparatively simple and inexpensive in its construction, which can be readily inserted in position or removed therefrom, and which will operate in a quick and effective manner to compress the spring so that the valve can be removed from position.

A further object of the invention is to provide an automobile valve lifter which comprises few and durable parts, which is compact in its construction so as to occupy but a small amount of space in a tool chest, and which is peculiarly constructed so that the jaws can be inserted in a very small space when brought together.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation showing a valve lifting tool constructed in accordance with the invention, the tool being shown in the position assumed when in use, and a portion thereof being broken away and shown in section. Fig. 2 is a perspective view of the valve lifter, and Fig. 3 is an enlarged sectional view on the line 3—3 of Fig. 1.

Corresponding and like parts are referred to in the following description and indicated in all the views of the drawings by the same reference characters.

Specifically describing the present embodiment of the invention, the numerals 1 and 2 designate a pair of complemental levers, the lever 1 being provided at one end thereof with a laterally extending arm 1ª. The corresponding end of the lever 2 is pivotally connected upon the extremity thereof, as indicated at 3. The free end of the lever 1 is provided with a flattened and forked jaw 4, and in a similar manner the free end of the lever 2 is formed with a flattened and forked jaw 5. These two jaws 4 and 5 gradually decrease in thickness from the base toward the outer ends thereof, thereby admitting of the jaws being brought very closely together, since the arm 1ª serves to offset the pivotal connection 3 from the plane of the lever 1 and jaw 4. The jaws can thus be brought very closely together and inserted in a comparatively small space, and at the same time the levers 1 and 2 can be made sufficiently large to possess the necessary strength.

The lever 2 is provided at a point toward the swinging end thereof with an enlarged portion 2ª which has an opening 6 therein, the edges of the opening being flared outwardly at 7 upon opposite sides of the lever 2. A corresponding portion of the lever 1 is provided with an enlargement 1ᵇ which has an opening 8 therein, the said opening loosely receiving a nut 9. This nut 9 is provided upon opposite sides thereof with the trunnions 10 which fit loosely within notches 11 formed in one face of the lever 1. A retaining plate 12 which is let into one side of the lever 1, so as to be substantially flush therewith normally closes the notches 11 so as to retain the trunnions 10 in position therein. Any suitable means, such as the screws 13, may be employed for retaining the plate 12 in position.

An operating screw 14 is threaded within the nut 9 and passes loosely through the opening 6 of the lever 2. This operating lever is provided at the upper end thereof with a head 15, and also with a shoulder 16 which is spaced from the head, the said head and shoulder being located upon opposite sides of the lever 2 so as to engage the same. It will also be observed that the shoulder 16 has a bevel face 16ª which corresponds to the flared end 7 of the opening 6. A handle 17 is applied to the head 15 and forms a convenient means for turning the adjusting screw 14.

In using the tool the jaws 4 and 5 are brought together and then inserted in position between the end of the valving spring 18 and a suitable abutment 19, the forked construction of the jaws enabling them to readily straddle the valve rod 20. By turning the adjusting screw 14 the jaws 4 and 5 can be forced apart so as to compress the spring 18, as indicated by Fig. 1. The valve can then be readily removed in the usual manner.

Having thus described the invention, what I claim as new and desire to secure by Letters Patent, is:—

A valve remover of the class described, including a pair of complemental levers formed of solid material and having apertures at intermediate points in their length, corresponding ends of the levers being formed with flattened jaws and the opposite ends thereof pivoted together, one of said apertures being larger than the other and the walls thereof provided with notches diametrically opposite each other, a nut provided with trunnions, said trunnions being adapted to be received in said notches, a plate fitting flush with the surface of the lever for retaining said trunnions in position, an adjusting screw loosely passing through the aperture of the opposite lever and provided with a head and a shoulder which are disposed upon opposite sides of the lever to prevent longitudinal movement of the screw in said aperture, said screw having a threaded connection with the nut, and means for turning said screw to move said jaw toward or away from each other.

In testimony whereof I affix my signature in presence of two witnesses.

CHARLES PRICE.

Witnesses:
 DAVID V. CARRUTH,
 IVERNA GRADY.

Copies of this patent may be obtained for five cents each, by addressing the "Commissioner of Patents, Washington, D. C."